Dec. 21, 1965 D. S. COCHRAN 3,225,298
IMPEDANCE TO VOLTAGE CONVERTER INCLUDING A POSITIVE
FEEDBACK PATH FOR SUPPLYING IMPEDANCE
TESTING CURRENT
Filed June 30, 1962
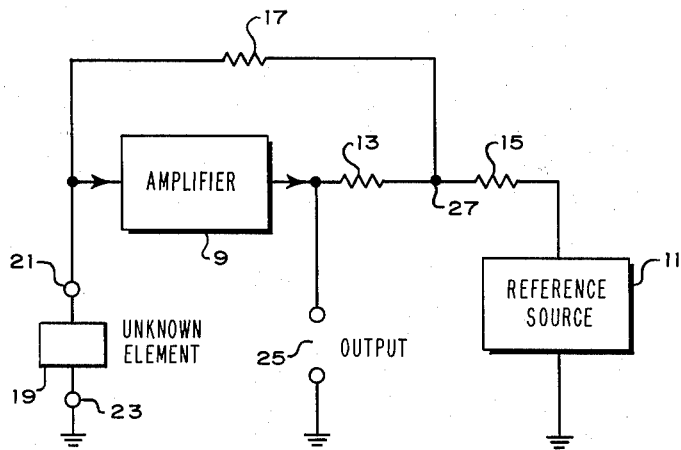
INVENTOR
DAVID S. COCHRAN
BY
ATTORNEY

United States Patent Office 3,225,298
Patented Dec. 21, 1965

3,225,298
IMPEDANCE TO VOLTAGE CONVERTER INCLUDING A POSITIVE FEEDBACK PATH FOR SUPPLYING IMPEDANCE TESTING CURRENT
David S. Cochran, Palo Alto, Calif., assignor to Hewlett-Packard Company, Palo Alto, Calif., a corporation of California
Filed July 30, 1962, Ser. No. 213,302
5 Claims. (Cl. 324—62)

This invention relates to a circuit for producing a signal having an amplitude which is related to the impedance of a measured element.

Certain digital voltmeters operate by counting pulses having a known repetition rate for a period of time which is linearly related to the amplitude of an applied signal. Digital indications of measured impedance can be provided in such circuits by providing a voltage which controls the duration of the counting period and which varies linearly with the impedance of the measured element. Conventional ohmmeter circuits operating on direct-current supplies generally provide a non-linear relationship between the resistance value and the resulting meter indication and therefore cannot readily be adapted for use in digital equipment.

Accordingly, it is an object of the present invention to provide a circuit which produces an output voltage that varies linearly with the impedance of the measured element.

It is another object of the present invention to provide an impedance-to-voltage converter which operates linearly over a wide range of impedance values.

It is still another object of the present invention to provide an impedance measuring circuit in which the element to be measured may be connected to ground.

Other and incidental objects of the present invention will be apparent from a reading of this specification and an inspection of the accompanying drawing which shows a schematic diagram of the present invention.

The diagram shows an amplifier 9 and a reference source 11. A series circuit including resistors 13 and 15 connects the output of amplifier 9 and the reference source 11. The input of amplifier 9 is connected through resistor 17 to point 27 between the resistors 13 and 15. The element 19 to be measured is connected between input terminal 21 and ground terminal 23. The voltage which is proportional to the impedance of the measured element is derived from output terminals 25 connected to the output of amplifier 9.

The amplifier 9 provides positive gain and is adapted to produce zero output volts when no signal is applied to the input. The input impedance of amplifier 9 is very high so that it operates with substantially zero input current. Current flowing in resistor 17 flows to ground through the measured element 19, thereby producing a voltage which is applied to the input of amplifier 9. The voltage appearing at output terminals 25 is thus related by the gain of amplifier 9 to the voltage appearing across the measured element 19. The ratio of resistors 13 and 15 is chosen to produce signal division or attenuation which is equal to the reciprocal of the gain of amplifier 9. This may be done by selecting the value of resistor 13 to equal the value of resistor 15 multiplied by the gain of amplifier 9 minus one. Thus, a change of one unit in the voltage at the input of amplifier 9 produces a change of one unit at the common connection 27 of resistors 13 and 15. Since the voltage difference across the end terminals of resistor 17 remains substantially constant, a constant current is caused to flow in resistor 17. The value of resistor 17 may be changed to provide ranges over which impedance values may be measured. Since all the constant current in resistor 17 flow in the element 19, the voltage appearing at output terminals 25 is directly proportional to the impedance of the measured element. Alternating-current measurements of impedance are made by providing an oscillator for the reference source 11. Direct-current measurements of resistance are made by providing a constant voltage source for reference source 11. The direct-current reference source 11 may be any convenient value ranging from a few volts to very large voltage values, and is typically about ten volts.

Therefore, the circuit of the present invention provides an output signal which is linearly related to the impedance of an unknown element over a wide range of impedance values. In addition, the circuit is readily adaptable for use both on alternating and direct current reference sources. Further, the present invention permits the measurement of an element connected to ground and also permits changing of the measurement ranges by changing a single resistor.

I claim:
1. A circuit for measuring the impedance of an element under test which has one terminal connected to a conductor of reference potential and which has another terminal, said circuit comprising:
  a source of reference signal having one terminal connected to said conductor and having another terminal;
  a non-inverting amplifier having an input and an output;
  a signal divider connected between the other terminal of said source of reference signal and said output;
  means connecting the other terminal of the element under test to said input; and
  means connected between said input and said signal divider at a terminal thereon which is intermediate the connections of said signal divider to said source and said output for providing a positive feedback path between said terminal on said signal divider and said input;
  the circuit providing a signal at said output which is related to the impedance of said element under test.

2. A circuit for measuring the impedance of an element under test which has one terminal connected to a conductor of reference potential and which has another terminal, said circuit comprising:
  a source of reference signal having one terminal connected to said conductor and having another terminal;
  an amplifier having an input and an output and providing positive gain;
  a signal divider having an output terminal and being connected between the other terminal of said source of reference signal and said output, the signal dividing ratio to the output terminal of said signal divider being related to the gain of said amplifier;
  means connecting the other terminal of the element under test to said input; and
  impedance means connected between said input and the output terminal of said signal divider for providing a positive feedback path between the signal divider and said input;
  the circuit providing a signal at said output which is related to the impedance of said element under test.

3. A circuit for measuring the impedance of an element under test which has one terminal connected to a conductor of reference potential and which has another terminal, said circuit comprising:
  a source of oscillatory signal having one terminal connected to said conductor and having another terminal;

an amplifier having an input and an output and providing positive gain;

a signal divider having an output terminal and being connected between the other terminal of said source of oscillatory signal and said output, said divider decreasing the amplitude of signal at said output by a factor equal to the reciprocal of the gain of said amplifier;

means connecting the other terminal of the element under test to said input; and impedance means connected between said input and the output terminal of said signal divider for providing a positive feedback path between said signal divider and said input;

the circuit providing a signal at said output which is related to the impedance of said element under test.

4. A circuit for measuring the resistance of an element under test, said circuit comprising:

a pair of input terminals for receiving an element under test, one of said pair of input terminals being connected to a conductor of reference potential;

a source of unidirectional voltage having one terminal connected to said conductor and having another terminal;

an amplifier having an input and an output and providing positive gain;

means connecting the other of said pair of input terminals to said input;

means including first and second resistors serially connected between the other terminal of said source of unidirectional voltage and said output; and means including a third resistor connected between the other of said pair of input terminals and a point intermediate said first and second resistors for providing a positive feedback path between said point and the input of said amplifier;

the circuit providing a signal at said output which is related to the resistance of said element.

5. A circuit according to claim 4 wherein the one of the said first and second resistors which is distally connected to said output has a unit resistance value and the other of the first and second resistors which is proximately connected to said output has a resistance value equal to said unit value multiplied by the gain of said amplifier minus one.

References Cited by the Examiner

UNITED STATES PATENTS

| | | | |
|---|---|---|---|
| 2,480,163 | 8/1949 | Romander | 330—100 |
| 3,056,082 | 9/1962 | Redding | 324—62 |
| 3,100,879 | 8/1963 | Greunke | 324—60 X |

WALTER L. CARLSON, *Primary Examiner.*

C. A. S. HAMRICK, E. E. KUBASIEWICZ,
*Assistant Examiners.*